United States Patent
Holden et al.

(10) Patent No.: US 7,415,563 B1
(45) Date of Patent: Aug. 19, 2008

(54) METHOD AND SYSTEM FOR ALLOWING A MEDIA PLAYER TO DETERMINE IF IT SUPPORTS THE CAPABILITIES OF AN ACCESSORY

(75) Inventors: Paul Holden, Sunnyvale, CA (US); Greg Marriott, Honolulu, HI (US); Donald J. Novotney, San Jose, CA (US); John B. Filson, San Jose, CA (US); David Tupman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/476,276

(22) Filed: Jun. 27, 2006

(51) Int. Cl.
*G06F 13/24* (2006.01)

(52) U.S. Cl. .................. 710/305; 710/37; 710/64; 710/73

(58) Field of Classification Search ......... 710/301–315, 710/8–13, 72–74, 62–66, 36–38, 29–31, 710/305; 455/557, 575; 719/327, 321; 709/220, 709/321
See application file for complete search history.

(56) References Cited

U.S. PATENT DOCUMENTS

| | | | |
|---|---|---|---|
| 5,150,031 A | | 9/1992 | James et al. |
| 5,964,847 A | | 10/1999 | Booth et al. |
| 6,012,105 A | * | 1/2000 | Rubbmark et al. ............ 710/14 |
| 6,453,371 B1 | * | 9/2002 | Hampson et al. ............... 710/37 |
| 6,725,061 B1 | * | 4/2004 | Hutchison et al. ............ 455/557 |
| 6,776,660 B1 | | 8/2004 | Kubota et al. |
| 6,931,456 B2 | * | 8/2005 | Payne et al. ..................... 710/9 |
| 7,050,783 B2 | * | 5/2006 | Curtiss et al. ............. 455/404.1 |
| 7,062,261 B2 | * | 6/2006 | Goldstein et al. ............ 455/419 |
| 7,127,879 B2 | * | 10/2006 | Zhu et al. ...................... 57/236 |
| 2002/0029303 A1 | | 3/2002 | Nguyen |
| 2003/0220988 A1 | * | 11/2003 | Hymel ........................ 709/220 |
| 2004/0103223 A1 | * | 5/2004 | Gabehart et al. ................ 710/2 |
| 2004/0224638 A1 | * | 11/2004 | Fadell et al. ................ 455/66.1 |
| 2005/0014531 A1 | * | 1/2005 | Findikli ....................... 455/557 |
| 2005/0022212 A1 | * | 1/2005 | Bowen ........................ 719/321 |
| 2006/0156415 A1 | | 7/2006 | Rubinstein et al. |
| 2006/0184456 A1 | * | 8/2006 | de Janasz ..................... 705/72 |

* cited by examiner

*Primary Examiner*—Raymond N Phan
(74) *Attorney, Agent, or Firm*—Townsend and Townsend and Crew LLP

(57) ABSTRACT

A method and system for allowing a media player to determine if it supports the capabilities of an accessory are disclosed. The method and system comprise requesting information about the capabilities of the accessory by the media player and providing information about the capabilities of the accessory by the accessory to the media player. The method and system further include utilizing the information to determine if the capabilities of the accessory are supported by the media player. Accordingly, a method and system in accordance with the present invention provides a system that allows a media player to obtain information from an accessory about the accessory's capability. A media player can then utilize this information to allow for the maximum functionality of the accessory when connected to the media player.

26 Claims, 12 Drawing Sheets

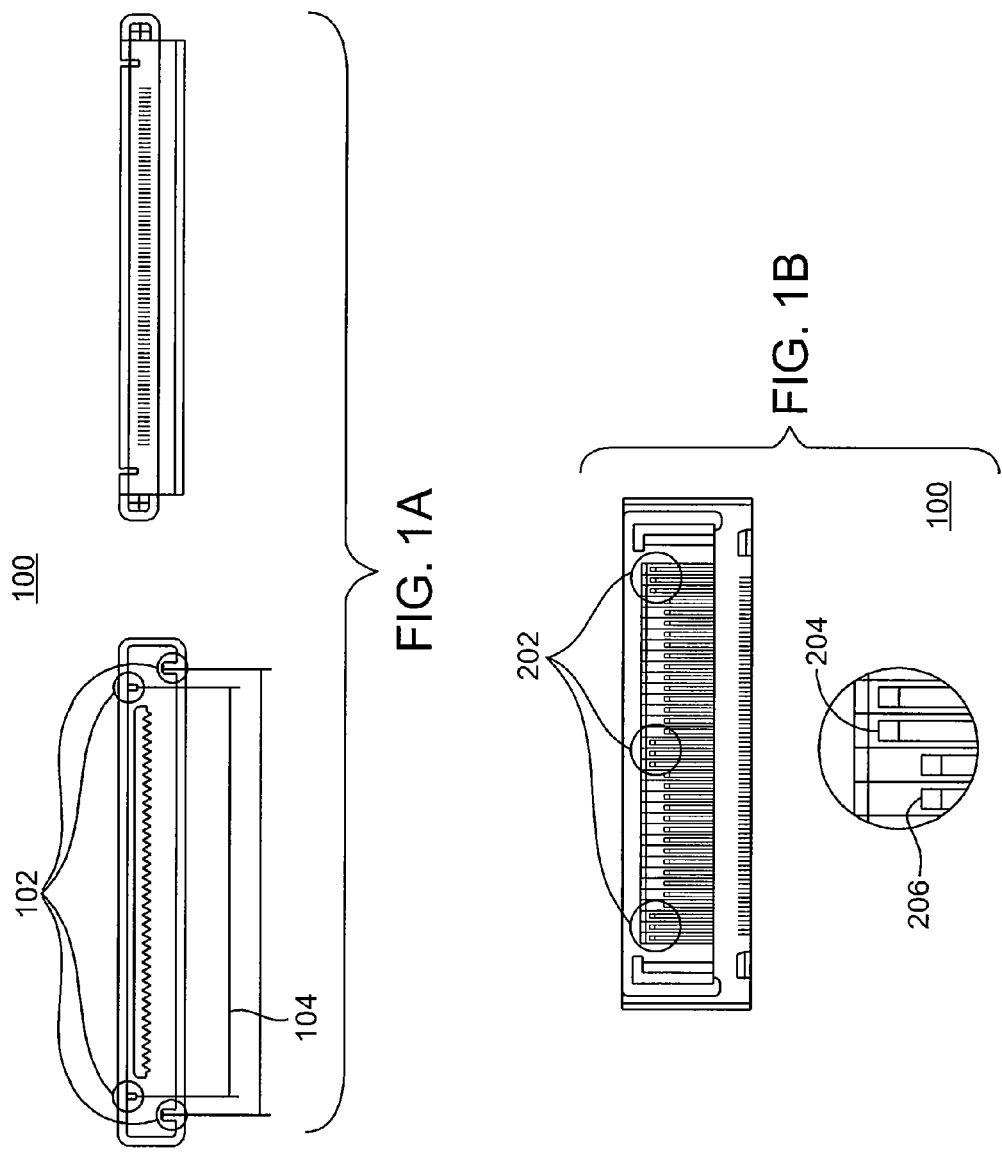

| Pin | Signal Name | I/O | Function |
|---|---|---|---|
| 1 | DGND | I | Digital Ground |
| 2 | DGND | I | Digital Ground |
| 3 | TPA+ | I/O | Firewire signal |
| 4 | USB D+ | I/O | USB signal |
| 5 | TPA- | I/O | Firewire signal |
| 6 | USB D- | I/O | USB signal |
| 7 | TPB+ | I/O | Firewire signal |
| 8 | USB PWR | I | USB power in, NOT for powering; only to detect USB host |
| 9 | TPB- | I/O | Firewire signal |
| 10 | Accessory Identify | I | Pull down in dock to notify iPod of specific device |
| 11 | F/W PWR+ | I | Firewire and charger input power (8V to 30V dc) |
| 12 | F/W PWR+ | I | Firewire and charger input power (8V to 30V dc) |
| 13 | ACCESSORY PWR(3V3) | O | 3.3V output from iPod. Current limited to 100mA. |
| 14 | Reserved | | |
| 15 | DGND | GND | Digital ground in iPod |
| 16 | DGND | GND | Digital ground in iPod |
| 17 | Reserved | | |
| 18 | Dock Tx | I | Serial protocol (Data to iPod) |
| 19 | Dock Rx | O | Serial protocol (Data from iPod) |
| 20 | Accessory Defect | I/O | |
| 21 | S Video Y | O | Luminance Component |
| 22 | S Video C | O | Chrominance Component |
| 23 | Video Composite | O | Composite Signal |
| 24 | Remote Sense | I | Detect Remote |
| 25 | LINE-IN L | I | Line level input to the iPod for the left channel |
| 26 | LINE-IN R | I | Line level input to the iPod for the right channel |
| 27 | LINE-OUT L | O | Line level output to the iPod for the left channel |
| 28 | LINE-OUT R | O | Line level output to the iPod for the right channel |
| 29 | Audio Return | GND | Audio return - Signal, never to be grounded inside accessory |
| 30 | DGND | GND | Digital ground iPod |
| 31 | Chassis | | Chassis ground for connector shell |
| 32 | Chassis | | Chassis ground for connector shell |

FIG. 3A

| Pin | Signal Name | I/O | Function |
|---|---|---|---|
| 1 | Audio Out Left / Mono Mic In | I/O | 30mW audio out left channel, also doubles as mono mic in |
| 2 | HP Detect | I | Internal Switch to detect plug insertion |
| 3 | Audio Return | GND | Audio return for left and right audio |
| 4 | Audio Out Right | O | 30mW audio out right channel |
| 5 | Composite Video | O | Video Signal |
| 6 | Accessory 3.3 V | O | 3.3V Accessory power 100mA max |
| 7 | Tx | O | Serial protocol (Data from iPod to Device) |
| 8 | Rx | I | Serial protocol (Data to iPod from Device) |
| 9 | D GND | GND | Digital ground for accessory |

FIG. 3B

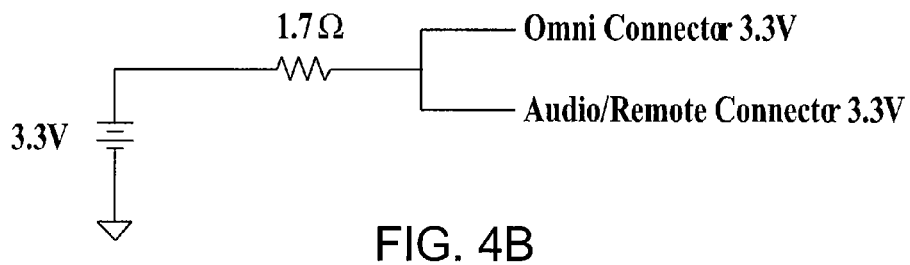

FIG. 4B

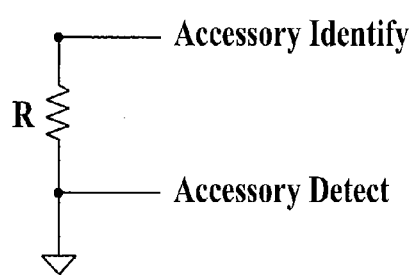

FIG. 4C

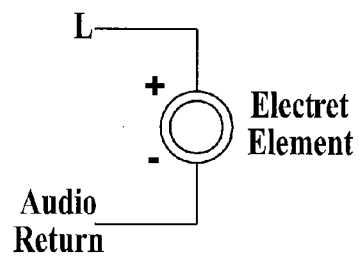

FIG. 4D

| Accessory Type Info |
|---|
| Meaning |
| Accessory info capabilities |
| Accessory name |
| Accessory minimum supported iPod firmware version |
| Accessory minimum supported command set |
| Accessory firmware version |
| Accessory hardware version |
| Accessory manufacturer |
| Accessory model number |
| Accessory serial number |
| Accessory incoming max packet size |
| Reserved |

FIG. 7

METHOD AND SYSTEM FOR ALLOWING A MEDIA PLAYER TO DETERMINE IF IT SUPPORTS THE CAPABILITIES OF AN ACCESSORY

FIELD OF THE INVENTION

The present invention relates generally to electrical devices and more particularly to electrical devices such as media players that communicate with accessory devices.

BACKGROUND OF THE INVENTION

A media player stores media assets, such as audio tracks, videos, and photos that can be played or displayed on the media player. One example of a media player is the iPod® media player, which is available from Apple Computer, Inc. of Cupertino, Calif. Often, a media player acquires its media assets from a host computer that serves to enable a user to manage media assets. As an example, the host computer can execute a media management application to manage media assets. One example of a media management application is iTunes®, version 6.0, produced by Apple Computer, Inc.

A media player typically includes one or more connectors or ports that can be used to interface to the media player. For example, the connector or port can enable the media player to couple to a host computer, be inserted into a docking system, or receive an accessory device. There are today many different types of accessory devices that can interconnect to the media player. For example, a remote control can be connected to the connector or port to allow the user to remotely control the media player. As another example, an automobile can include a connector and the media player can be inserted onto the connector such that an automobile media system can interact with the media player, thereby allowing the media content on the media player to be played within the automobile.

Currently, the connectors or ports of a media player are open for use so long as a compatible connector or port is utilized. Consequently, numerous third-parties have developed accessory devices for use with other manufacturers' media players. One difficulty is that since a media player communicates with a variety of accessories it does not know the capabilities of the accessory and may not support the capabilities of the accessory.

Accordingly, it is desirable for the media player to know those capabilities and to know whether it supports the capabilities of an associated accessory. Therefore it is also desirable to provide a method and system for allowing a media player to efficiently and effectively determine the capabilities of an accessory and determine if the media player supports such capabilities. The present invention addresses such a need.

SUMMARY OF THE INVENTION

A method and system for allowing a media player to determine if it supports the capabilities an accessory are disclosed. The method and system comprise requesting information about the capabilities of the accessory by the media player and providing information about the capabilities of the accessory by the accessory to the media player. The method and system further include utilizing the information to determine if the capabilities of the accessory are supported by the media player.

Accordingly, a method and system in accordance with the present invention allow a media player to obtain information from an accessory about the accessory's capability. A media player can then utilize this information to allow for the maximum functionality of the accessory when connected to the media player.

DESCRIPTION OF THE DRAWINGS

FIGS. 1A and 1B illustrate a docking connector in accordance with the present invention.

FIG. 3A illustrates the connector pin designations for the docking connector.

FIG. 3B illustrates the connection pin designations for the remote connector.

FIG. 4B illustrates a reference schematic diagram for an accessory power source.

FIG. 4C illustrates a reference schematic diagram for a system for detecting and identifying accessories for the docking connector.

FIG. 4D is a reference schematic of an electret microphone that may be connected to the remote connector.

FIG. 7 is a chart of all the accessory information types requested by the media player.

DETAILED DESCRIPTION OF THE INVENTION

Figure 2A:
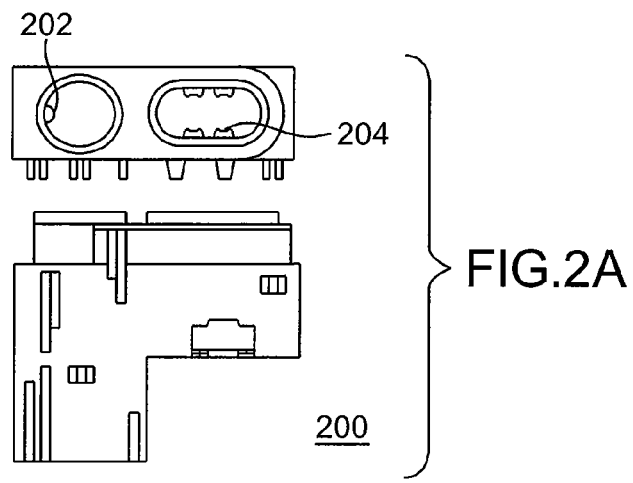
FIG. 2A is a front and top view of a remote connector in accordance with the present invention.

The present invention relates generally to electrical devices and more particularly to electrical devices such as media players that communicate with accessory devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A method and system in accordance with the present invention allow a media player to obtain information from an accessory. A media player can then utilize this information to allow for the maximum functionality of the accessory when connected to the media player. In one embodiment commands are utilized to facilitate communication of this information between the media player and the accessory.

These commands could be utilized in a variety of environments. One such environment is within a connector interface system environment such as described in detail hereinbelow.

Connector Interface System Overview

To describe the features of the connector interface system in accordance with the present invention in more detail, refer now to the following description in conjunction with the accompanying drawings.

Docking Connector

FIGS. 1A and 1B illustrate a docking connector 100 in accordance with the present invention. Referring first to FIG. 1A, the keying features 102 are of a custom length 104. In addition, a specific key arrangement is used, where one set of keys separated by one length are at the bottom and another set of keys separated by another length are at the top of the connector. The use of this key arrangement prevents noncompliant connectors from being plugged in and causing potential damage to the device. The connector for power utilizes a Firewire specification for power [the connector also can accept power from USB]. The connector includes a first make/last break contact to implement this scheme. FIG. 1B illustrates the first make/last break contact 202 and also illustrates a ground pin and a power pin related to providing an appropriate first make/last break contact. In this example, the ground pin 204 is longer than the power pin 206. Therefore, the ground pin 204 would contact its mating pin in the docking accessory before the power pin 206. Therefore internal electrical damage of the electronics of the device is minimized.

In addition, a connector interface system in accordance with the present invention uses both USB and Firewire interfaces as part of the same docking connector alignment, thereby making the design more compatible with different types of interfaces, as will be discussed in detail hereinafter. In so doing, more remote accessories can interface with the media player.

Remote Connector

Figure 2B:
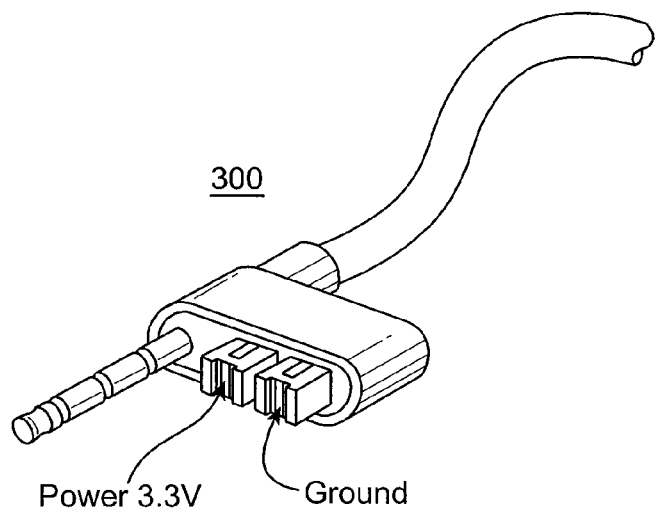
FIG. 2B illustrates a plug to be utilized in the remote connector.
Figure 2C:
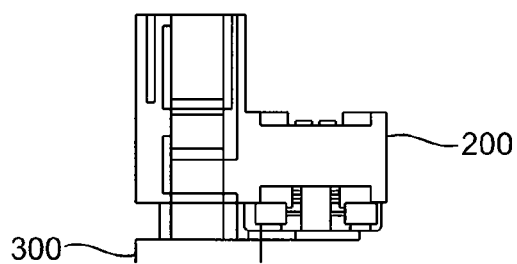
FIG. 2C illustrates the plug inserted into the remote connector.

The connection interface system also includes a remote connector which provides for the ability to output audio, input audio, and output video and which also provides I/O serial protocol. FIG. 2A is a front and top view of a remote connector 200 in accordance with the present invention. As is seen, the remote connector 200 includes a top headphone receptacle 202, as well as a second receptacle 204 for remote devices. FIG. 2B illustrates a plug 300 to be utilized in the remote connector. The plug 300 allows the features to be provided via the remote connector. FIG. 2C illustrates the plug 300 inserted into the remote connector 200. Heretofore, all these features have not been implemented in a remote connector. Therefore, a standard headphone cable can be plugged in but also special remote control cables, microphone cables and video cables could be utilized with the remote connector.

To describe the features of the connector interface system in more detail, please find below a functional description of the docking connector, remote connector and a command set in accordance with the present invention.

Docking and Remote Connector Specifications

For an example of the connector pin designations for both the docking connector and for the remote connector for a media player such as an iPod device by Apple Computer, Inc., refer now to FIGS. 3A and 3B. FIG. 3A illustrates the connector pin designations for the docking connector. FIG. 3B illustrates the connection pin designations for the remote connector.

Docking Connector Specifications

Figure 4A:
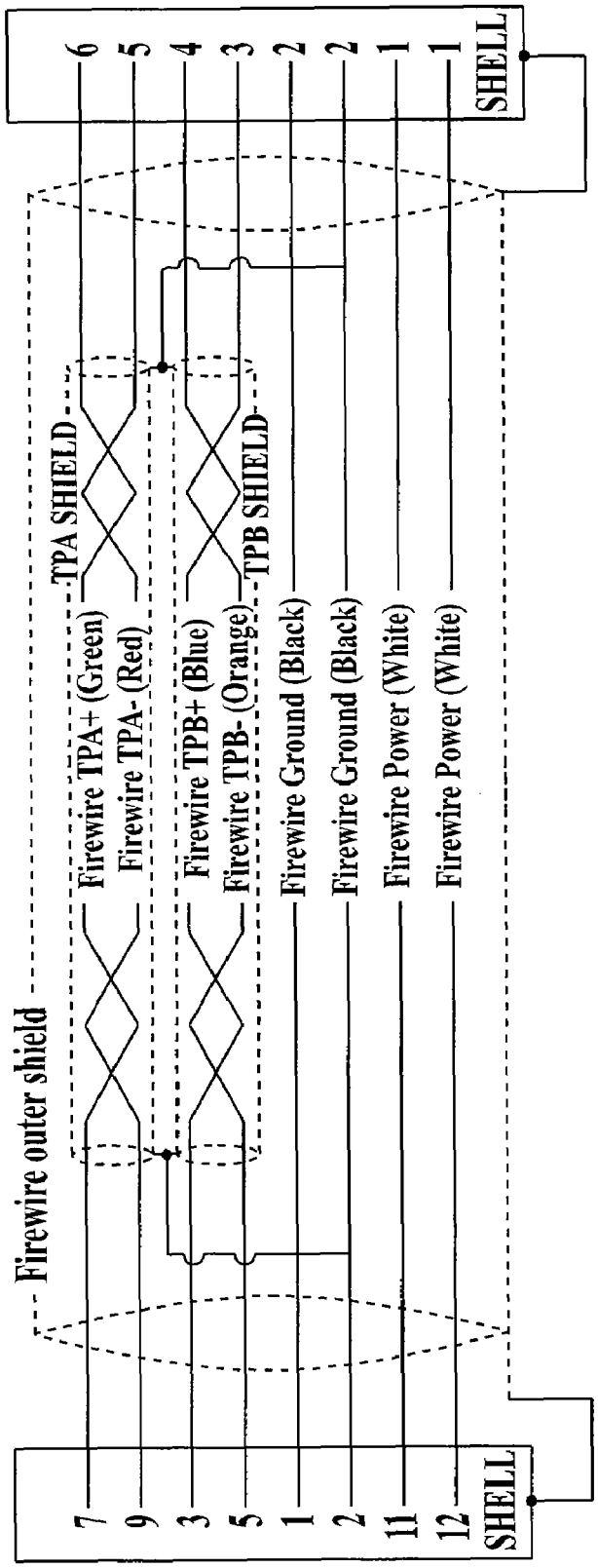
FIG. 4A illustrates a typical FireWire connector interface for the docking connector.

FIG. 4A illustrates a typical Firewire connector interface for the docking connector:

Firewire Power:
a) 8V-30V DC IN
b) 10W Max
Firewire:
a) Designed to IEEE 1394 A Spec (400 Mb/s)

USB Interface

The media player provides two configurations, or modes, of USB device operation: mass storage and media player USB Interface (MPUI). The MPUI allows the media player to be controlled using a media player accessory protocol (MPAP) which will be described in detail later herein, using a USB Human Interface Device (HID) interface as a transport mechanism.

Accessory 3.3 V Power

FIG. 4B illustrates the accessory power source. The media player accessory power pin supplies voltages, for example, 3.0 V to 3.3V+/−5% (2.85 V to 3.465 V) over the 30-pin connector and remote connector (if present). A maximum current is shared between the 30-pin and Audio/Remote connectors.

By default, the media player supplies a particular current such as 5 mA. Proper software accessory detect is required to turn on high power (for example, up to 100 mA) during active device usage. When devices are inactive, they must consume less than a predetermined amount of power such as 5 mA current.

Accessory power is grounded through the DGND pins.

FIG. 4C illustrates a reference schematic diagram for a system for detecting and identifying accessories for the docking connector. The system comprises:

a) A resistor to ground allows the device to determine what has been plugged into docking connector. There is an internal pullup on Accessory Identify.

b) Two pins required (Accessory Identify & Accessory Detect)

FIG. 4D is a reference schematic of an electret microphone that is connected to the remote connector.

Serial Protocol Communication:

a) Two pins used to communicate to and from device (Rx & Tx)

b) Input & Output (0V=Low, 3.3V= High)

Figure 5A:
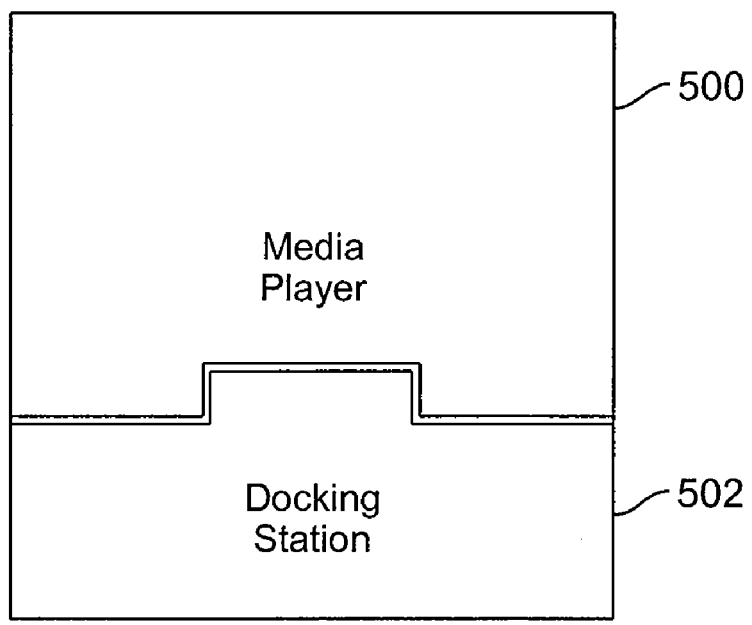
FIG. 5A illustrates a media player coupled to different accessories
Figure 5B:
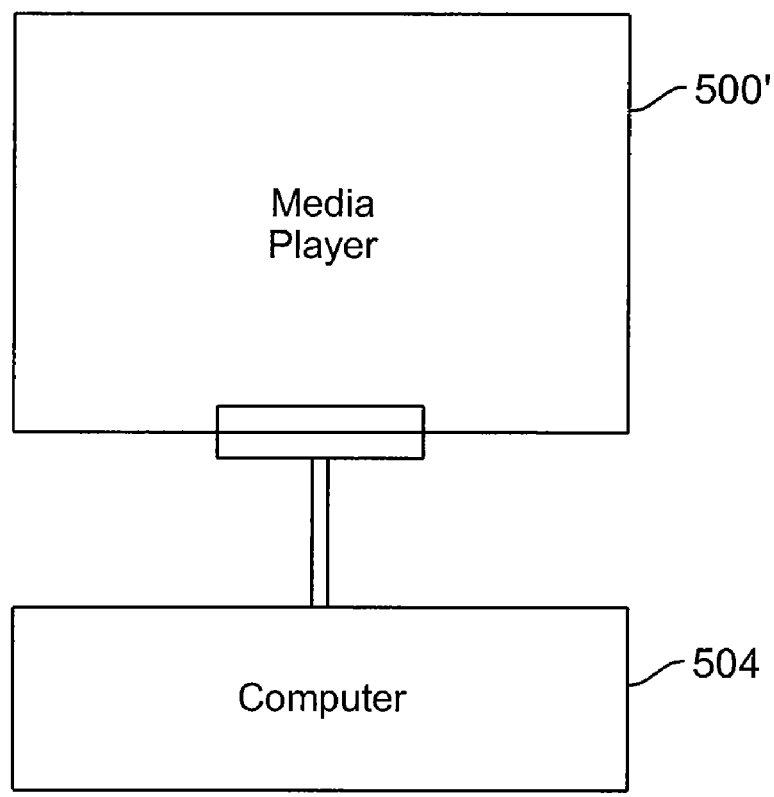
FIG. 5B illustrates the media player coupled to a computer.
Figure 5C:
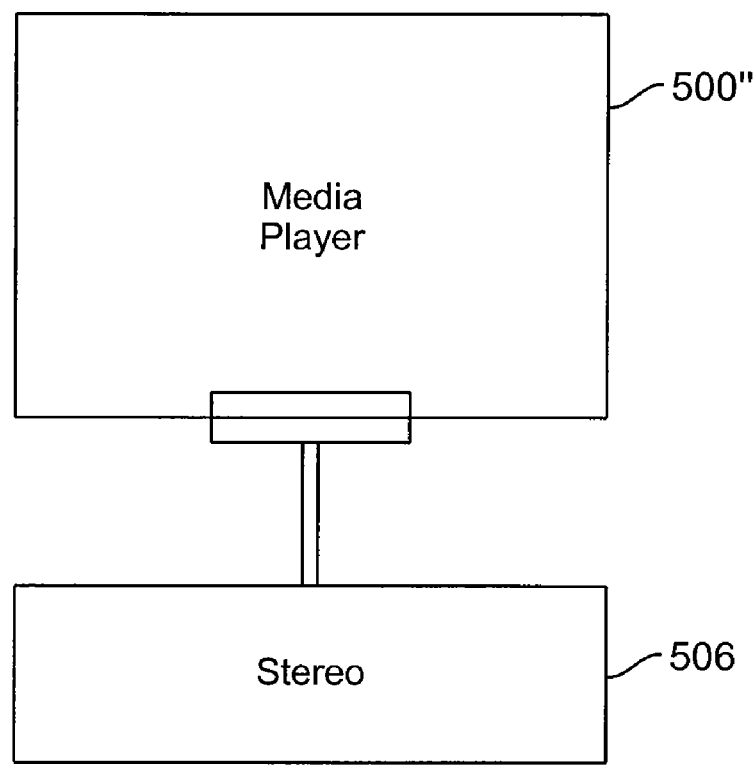
FIG. 5C illustrates the media player coupled to a car or home stereo system.
Figure 5D:
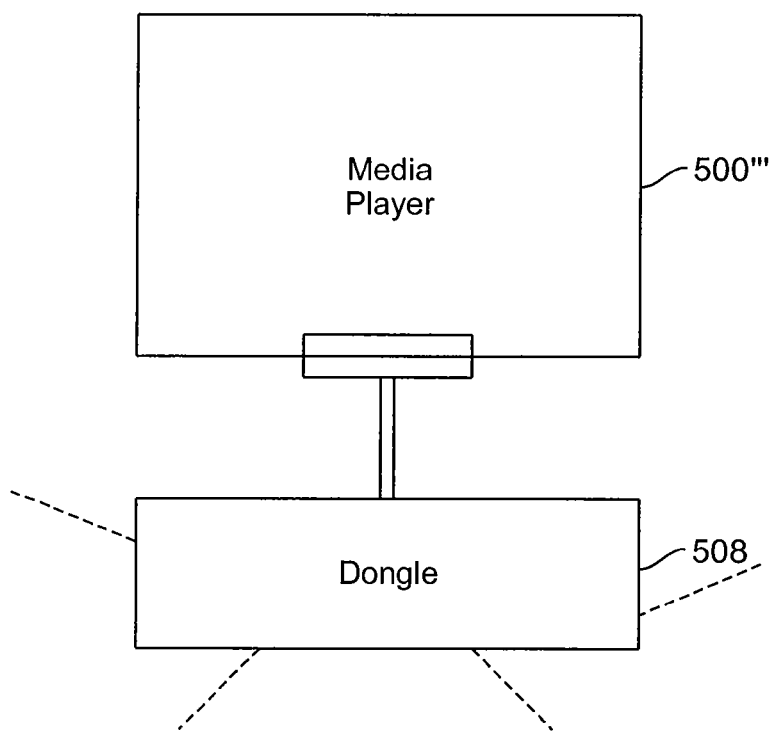
FIG. 5D illustrates the media player coupled to a dongle that communicates wirelessly with other accessories.
Figure 5E:
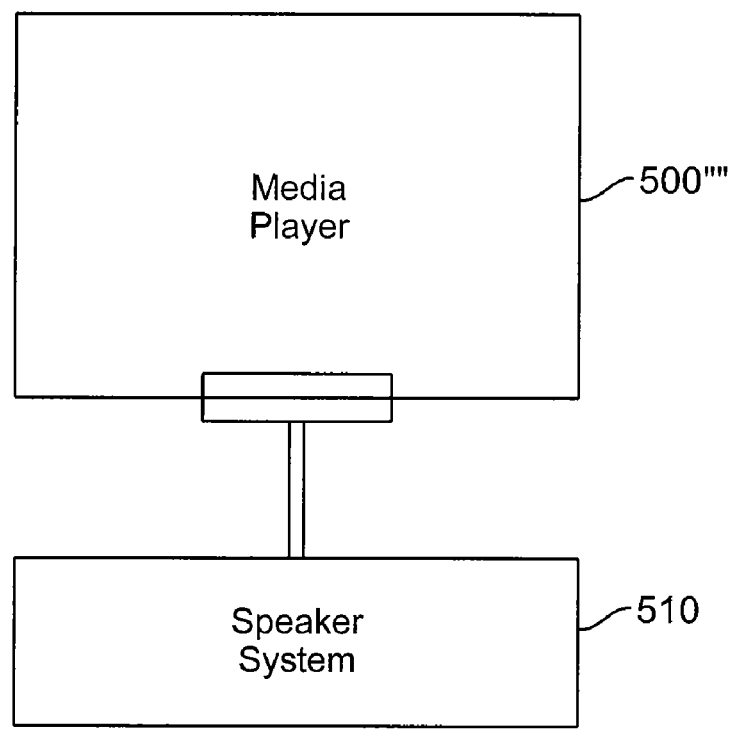
FIG. 5E illustrates the media player coupled to a speaker system.

As before mentioned, media players connect to a variety of accessories. FIGS. 5A-5E illustrates a media player 500 coupled to different accessories. FIG. 5A illustrates a media player 500 coupled to a docking station 502. FIG. 5B illustrates the media player 500' coupled to a computer 504. FIG. 5C illustrates the media player 500" coupled to a car or home stereo system 506. FIG. 5D illustrates the media player 500'" coupled to a dongle 508 that communicates wirelessly with other devices. FIG. 5E illustrates the media player 500"" coupled to a speaker system 510. As is seen, what is meant by accessories includes but is not limited to docking stations, chargers, car stereos, microphones, home stereos, computers, speakers, and accessories which communicate wirelessly with other accessories.

As before mentioned, this connector interface system could be utilized with a command set for allowing a media player to obtain information from an accessory about its capabilities to allow the media player to determine if it supports the capabilities of the accessory. It should be understood by one of ordinary skill in the art that although the above-identified connector interface system could be utilized with the command set a variety of other connectors or systems could be utilized and they would be within the spirit and scope of the present invention. To describe the utilization of the command set in more detail refer now to the accompanying description in conjunction with the accompanying Figure.

Figure 6:
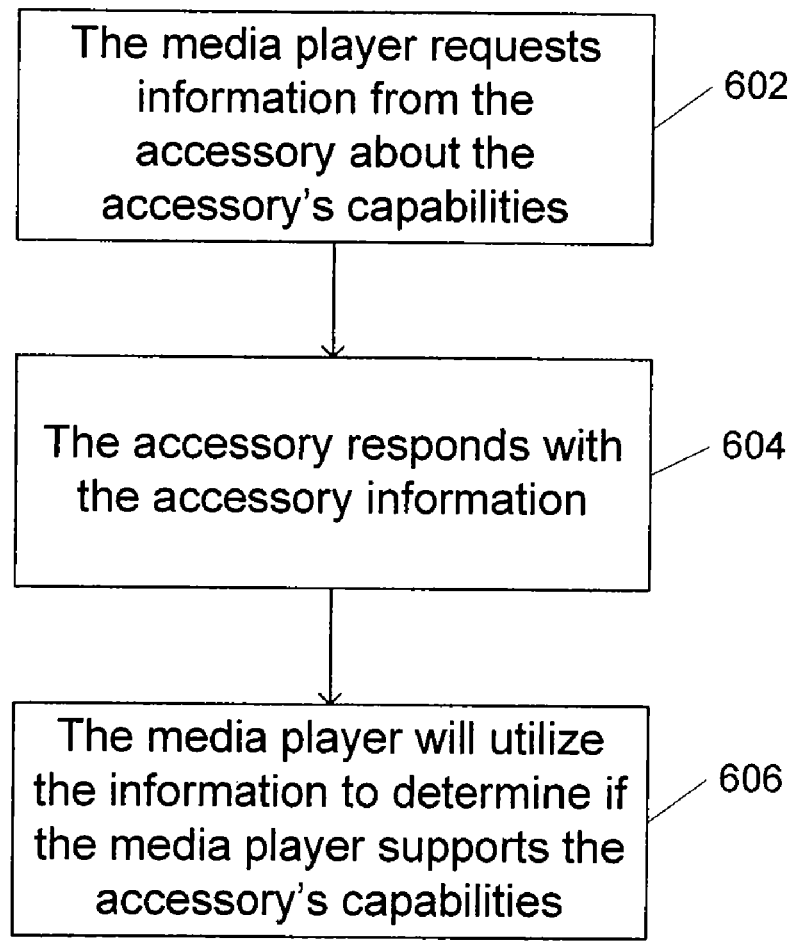
FIG. 6 is a simple flow chart illustrating a process for allowing a media player to determine the capabilities of an accessory.

FIG. 6 is a simple flow chart illustrating a process for allowing a media player to utilize information obtained from an accessory. First, the media player requests information from the accessory about the accessory's capabilities, via step 602. Next, the accessory responds with the accessory information, via step 604. Finally, the media player will utilize the information to determine if it supports the accessory's capabilities, via step 606. For example, the information gathered will be used by the media player to:

Post accessory information on a display on the media player,

Post a message on the display if the media player firmware needs to be updated to support the accessory, Post a UI message if the media player firmware does not support the accessory.

To allow for the determination of the capabilities of the accessory by the media player two commands are passed therebetween. They are a get accessory information (GetAccessoryInfo) command and a return accessory information (RetAccessoryInfo) command. These commands will be described in more detail hereinbelow.

GetAccessoryInfo Command

This command requests a plurality of accessory information from the accessory. An example of a list of requested accessory information types is shown in the table of FIG. 7. The media player may for example request the parameters in the order they are listed in the Table of FIG. 7.

When the GetAccessoryInfo command is sent with an accessory minimum supported media player firmware version info type, the media player model number and the media player firmware version are sent as parameters.

When the GetAccessoryInfo command is sent with an accessory minimum supported command set info type, the command set number for which the media player is requesting the minimum supported version is sent as a parameter. What is meant by a command set is one or more commands that are related to a particular accessory's functionality. For example a microphone command set is related to a microphone functionality, a simple remote command is related to a remote control functionality. Therefore there are a variety of command sets that could be utilized with a particular accessory based upon the accessory's functionality. The media player will send the GetAccessoryInfo command for every command set the accessory indicates it supports.

In one embodiment, the media player will begin sending commands as soon as an accessory identifies successfully. If the accessory does not respond, the media player will wait predetermined time period for a response before timing out and retrying.

RetAccessoryInfo Command

The accessory sends this command in response to the GetAccessoryInfo command. Utilizing this command the accessory returns accessory information to the media player.

In one embodiment, if an unknown or unsupported media player Model ID is sent to the accessory when requesting the accessory's minimum supported media player firmware version for that particular Model ID, the accessory should return a RetAccessoryInfo command with the media player Model ID and a payload indicating that the accessory does not recognize that particular media player Model ID.

If the accessory's minimum supported media player firmware version is higher than the media player firmware version, and one or more of the command sets are not supported by the media player, the media player will post a message indicating that the media player firmware should be updated.

If the accessory's minimum supported media player firmware version is smaller or equal to the media player firmware version, and one or more of the command sets is higher than that supported by the media player, the media player will post a message indicating that the media player does not support the accessory.

Accordingly, a method and system in accordance with the present invention provides a system that allows a media player to obtain information from an accessory. In so doing, a media player can then utilize this information to allow for the maximum functionality of the accessory when connected to the media player.

Although the present invention has been described in accordance with the embodiments shown, one of ordinary skill in the art will readily recognize that there could be variations to the embodiments and those variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

What is claimed is:

1. A method for establishing communication between a media player and an accessory, the method comprising, by the media player:
    sending to the accessory a first command packet including a request for capability information, the request including an information type indicator designating one of a plurality of information items as being requested, wherein the plurality of information items includes:
        a minimum media player firmware version information item identifying a minimum version of media player firmware required to support the accessory;
        a command set information item identifying a version of a command set used by the accessory; and
        an accessory firmware version information item identifying a version of firmware used by the accessory;
    receiving, in response to the request, a second command packet including the requested information item; and
    determining, based on the received information item, whether the media player supports the accessory.

2. The method of claim 1 wherein the accessory supports a plurality of command sets, each command set implementing a different functionality, and wherein in the event that the information type indicator corresponds to the command set information item, the first command packet further includes a command set identifier specifying one of the plurality of command sets as the command set for which version information is requested.

3. The method of claim 1 wherein the plurality of information items further includes:
    an accessory hardware version information item specifying a version of hardware used in the accessory;
    an accessory manufacturer information item specifying a manufacturer of the accessory;
    an accessory model number information item specifying a model number of the accessory;

an accessory serial number information item specifying a serial number of the accessory; and an accessory incoming maximum packet size information item specifying a maximum command packet size that the accessory is capable of receiving from the media player.

4. The method of claim 1 wherein the plurality of information items further includes:

an accessory capability information item indicating an information capability of the accessory; and an accessory name information item indicating a name of the accessory.

5. The method of claim 1 further comprising:

displaying, on a display device of the media player, one or more of the information items obtained from the accessory.

6. The method of claim 1 further comprising:

in the event that the act of determining results in a determination that the media player does not support the accessory, displaying, on a display device of the media player, a message indicating that firmware of the media player should be upgraded to support the accessory.

7. The method of claim 1 further comprising:

in the event that the act of determining results in a determination that the media player does not support the accessory, displaying, on a display device of the media player, a message indicating that the media player does not support the accessory.

8. A method for establishing communication between a media player and an accessory, the method comprising, by the media player:

sending to the accessory a first command packet including a request for the accessory to identify a minimum media player firmware version supported by the accessory;

receiving from the accessory, in response to the first command packet, a second command packet including the minimum media player firmware version supported by the accessory;

sending to the accessory a third command packet including a request for the accessory to identify a version of a command set supported by the accessory;

receiving from the accessory, in response to the third command packet, a fourth command packet including the version of the command set supported by the accessory; and determining, based on the minimum media player firmware version supported by the accessory and the version of the command set supported by the accessory, whether the media player supports the accessory.

9. The method of claim 8 wherein determining includes:

comparing the minimum media player firmware version supported by the accessory to a firmware version in use by the media player; and in the event that the firmware version in use by the media player is lower than the minimum media player firmware version supported by the accessory, determining that the media player firmware should be upgraded.

10. The method of claim 9 further comprising:

in the event that the media player firmware should be upgraded, displaying, on a display device of the media player, a notification that the media player firmware should be upgraded.

11. The method of claim 9 wherein determining further includes:

in the event that the firmware version in use by the media player is at least equal to the minimum media player firmware version supported by the accessory, comparing the version of the command set supported by the accessory to a version of the command set used by the media player; and in the event that the version of the command set supported by the accessory is higher than the version of the command set supported by the media player, determining that the media player does not support the accessory.

12. The method of claim 11 further comprising:

in the event that the media player does not support the accessory, displaying, on a display device of the media player, a notification that the media player does not support the accessory.

13. The method of claim 11 wherein the first command packet further includes a model identifier of the media player and a firmware version parameter identifying a firmware version in use by the media player and wherein the minimum media player firmware version received in the second command packet depends at least in part on the model identifier of the media player.

14. A method for establishing communication between a media player and an accessory, the method comprising, by the accessory:

receiving a first command packet from the media player, the first command packet including a command requesting information from the accessory, an information type indicator designating one of a plurality of information items as being requested, and a media player model identifier, wherein the plurality of information items includes:

a command set information item identifying a version of a command set used by the accessory; and an accessory firmware version information item identifying a version of firmware used by the accessory;

determining, based at least in part on the media player model identifier and the information type indicator, an information item to provide in response to the first command packet; and returning to the media player a second command packet including the information item.

15. The method of claim 14 wherein the plurality of information items further includes a minimum media player firmware version supported by the accessory.

16. The method of claim 14 wherein determining an information item to provide includes:

determining whether the media player model identifier is recognized by the accessory; and in the event that the media player model identifier is not recognized, including in the second command packet a payload indicating that the media player model identifier is not recognized.

17. A media player comprising:

a storage device configured to store media assets;

a control module configured to execute at least one application for accessing the stored media assets;

an interface configured to exchange commands and associated data with an accessory; and a command module coupled between the interface and the control module and configured to operate the interface to exchange commands and associated data with the accessory, wherein the commands include:

an information requesting command sendable to the accessory, the information requesting command requesting capability information from the accessory, the information requesting command having as associated data an information type indicator designating one of a plurality of information items as being requested, wherein the plurality of information items includes a minimum media player firmware version information item identifying a minimum version of media player firmware required to support the accessory, a command set information item identifying a version of a command set used by the accessory, and an accessory firmware version information item identifying a version of firmware used by the accessory; and an information providing command receivable from the accessory, the information providing command having as associated data a requested information item.

18. The media player of claim 17 wherein the plurality of information items further includes:

an accessory hardware version information item specifying a version of hardware used in the accessory;

an accessory manufacturer information item specifying a manufacturer of the accessory;

an accessory model number information item specifying a model number of the accessory;

an accessory serial number information item specifying a serial number of the accessory; and an accessory incoming maximum packet size information item specifying a maximum command packet size that the accessory is capable of receiving from the media player.

19. The media player of claim 17 wherein the plurality of information items further includes:

an accessory capability information item indicating an information capability of the accessory; and an accessory name information item indicating a name of the accessory.

20. The media player of claim 17 further comprising:

a display configured to display information including one or more information items obtained from the accessory using the information requesting command and the information providing command.

21. The media player of claim 20 wherein the control module is further configured to operate the display to display a message indicating inability of the media player to support the accessory, wherein inability of the media player to support the accessory is determined based on one or more information items obtained from the accessory using the information requesting command and the information providing command.

22. The media player of claim 20 wherein the control module is further configured to operate the display to display a message indicating a need for a firmware upgrade to the media player, wherein the need for the firmware upgrade to the media player is determined based on one or more information items obtained from the accessory using the information requesting command and the information providing command.

23. An accessory for use with a media player, the accessory comprising:

an interface configured to communicably couple the accessory to a media player configured to store a plurality of media assets; and control logic coupled to the interface and configured to exchange commands and associated data with the media player via the interface, wherein the commands include:

an information requesting command receivable by the accessory, the information requesting command requesting capability information from the accessory, the information requesting command having as associated data an information type indicator designating one of a plurality of information items as being requested, wherein the plurality of information items includes a minimum media player firmware version information item identifying a minimum version of media player firmware required to support the accessory, a command set information item identifying a version of a command set used by the accessory, and an accessory firmware version information item identifying a version of firmware used by the accessory, wherein for at least one of the plurality of information items, the associated data for the information requesting command further includes a media player model identifier; and an information providing command sendable by the accessory, the information providing command having as associated data a requested information item.

24. The accessory of claim 23 wherein the control logic is further configured to select, based at least in part on the media player model identifier, the information item to be included as associated data with the information providing command.

25. The accessory of claim 24 wherein the plurality of information items further includes a minimum media player firmware version information item identifying a minimum version of media player firmware required to support the accessory.

26. The accessory of claim 24 wherein the control logic is further configured such that in the event that the media player model identifier is not recognized by the control logic, the information providing command includes, as associated data, a payload indicating that the media player model identifier is not recognized.

* * * * *